United States Patent
Hida et al.

(10) Patent No.: US 12,129,360 B2
(45) Date of Patent: Oct. 29, 2024

(54) SPHERICAL FORSTERITE PARTICLES, METHOD FOR PRODUCING THE SAME, AND RESIN COMPOSITION INCLUDING SPHERICAL FORSTERITE PARTICLES

(71) Applicant: NISSAN CHEMICAL CORPORATION, Tokyo (JP)

(72) Inventors: Masahiro Hida, Funabashi (JP); Shuhei Yamada, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 633 days.

(21) Appl. No.: 17/298,086

(22) PCT Filed: Nov. 27, 2019

(86) PCT No.: PCT/JP2019/046378
§ 371 (c)(1),
(2) Date: May 28, 2021

(87) PCT Pub. No.: WO2020/111126
PCT Pub. Date: Jun. 4, 2020

(65) Prior Publication Data
US 2022/0017724 A1  Jan. 20, 2022

(30) Foreign Application Priority Data
Nov. 29, 2018 (JP) ................ 2018-223166

(51) Int. Cl.
*C08K 9/06* (2006.01)
*C01B 33/22* (2006.01)
*C08K 3/34* (2006.01)
*C08L 101/00* (2006.01)
*C09C 1/28* (2006.01)
*C09C 1/30* (2006.01)
*C09C 3/12* (2006.01)

(52) U.S. Cl.
CPC ............ *C08K 9/06* (2013.01); *C01B 33/22* (2013.01); *C08K 3/34* (2013.01); *C08L 101/00* (2013.01); *C09C 1/28* (2013.01); *C09C 1/3081* (2013.01); *C09C 3/12* (2013.01); *C01P 2004/32* (2013.01); *C01P 2004/61* (2013.01); *C01P 2004/62* (2013.01); *C01P 2006/40* (2013.01); *C08K 2201/005* (2013.01)

(58) Field of Classification Search
CPC ...... C08K 9/06; C08K 3/34; C08K 2201/005; C01B 33/22; C09C 1/3081; C09C 3/12; C09C 1/28; C08L 101/00; C01P 2004/32; C01P 2004/61; C01P 2004/62; C01P 2006/40
See application file for complete search history.

(56) References Cited

U.S. PATENT DOCUMENTS

2012/0022087 A1*  1/2012  Rimkus ............... A61K 9/1641
                                                  514/274
2016/0303001 A1* 10/2016  Tsubata ............... A61K 8/022

FOREIGN PATENT DOCUMENTS

| JP | 2003-002640 A | 1/2003 |
| JP | 2004-284830 A | 10/2004 |
| JP | 2007-039304 A | 2/2007 |
| JP | 2007-079309 A | 3/2007 |
| JP | 2015-182934 A | 10/2015 |
| JP | 2016-222517 A | 12/2016 |
| WO | WO 2007/072065 * | 6/2007 |
| WO | 2016/021688 A1 | 2/2016 |

OTHER PUBLICATIONS

Machine English translation of JP 2007-079309, Yasunaga et al., Mar. 29, 2007.*
Author Unknown, MASTERSIZER 2000 User Manual, by Malvern Instruments, Mar. 2007, 154 pages.*
Feb. 10, 2020 International Search Report issued in International Patent Application No. PCT/JP2019/046378.
Feb. 10, 2020 Written Opinion issued in International Patent Application No. PCT/JP2019/046378.
Masahiro Hida et al. "Electric Insulation Forsterite Nano-Particles". Proceedings of the 46th Symposium on Electrical and Electronic Insulating Materials and Applications in Systems, 2015, pp. 305-306.
Jan. 23, 2024 China Office Action issued in Chinese Patent Application No. 201980078752.0.

* cited by examiner

*Primary Examiner* — Patrick D Niland
(74) *Attorney, Agent, or Firm* — Oliff PLC

(57) ABSTRACT

Forsterite particles have an average size of 0.1 μm to 10 μm and a dielectric loss tangent of 0.0003 to 0.0025. Sphericity=(Average particle size (μm) measured with a laser diffraction particle size distribution analyzer)/(Average primary particle size (μm) calculated by conversion using specific surface area measured by a nitrogen gas adsorption method) may be from 1.0 to 3.3. This method for producing forsterite particles may include: step (A): mixing a magnesium compound as a magnesium source and a silicon compound as a silicon source so $MgO/SiO_2$ has a molar ratio of 1.90 to 2.10 to prepare particles; step (B): putting the particles prepared in step (A) into a hydrocarbon combustion flame to recover the resulting particles; and step (C): firing the particles obtained in step (B) at 700° C. to 1100° C. The ratio between a resin and the particles may be 1:0.001 to 1000 by mass ratio.

9 Claims, No Drawings

SPHERICAL FORSTERITE PARTICLES, METHOD FOR PRODUCING THE SAME, AND RESIN COMPOSITION INCLUDING SPHERICAL FORSTERITE PARTICLES

TECHNICAL FIELD

The present invention relates to spherical forsterite particles, a method for producing the particles, and a resin composition including spherical forsterite particles.

BACKGROUND ART

Communication technology using microwaves needs high-capacity, high-speed data communication with higher frequencies. In mobile phones, for instance, the communication standard is being shifted from 4G (3 GHz to 4 GHz) to 5G (28 GHz) high frequencies. Further, among automobiles equipped with an automatic driving system, there are automobiles equipped with a millimeter-wave radar at a frequency of, for instance, about 24 GHz to 76 GHz as a radar frequency for recognizing surrounding obstacles, and the number has been increasing in recent years.

On a printed circuit board (PCB) after parts are mounted, a resin is used for inter-wiring insulation. In order to improve the insulating property of the resin, it has been sought to include, as a filler, a highly insulating substance having a thermal expansion coefficient matched with that of the resin. Forsterite can be exemplified as one of them.

The signal transmission speed is improved by increasing the frequency, but the transmission loss is also increased. The dielectric loss increases in proportion to the frequency (f), the dielectric loss tangent (tan δ), and the relative permittivity (εr).

The permittivity is a value that indicates the magnitude of polarization. The relative permittivity indicates the ratio between the medium permittivity and the vacuum permittivity. Both are values each indicating the magnitude of characteristic that is among capacitor specifics.

When a dielectric is exposed to an electromagnetic wave, polarization occurs. Then, polarization reversal is induced by alternating electric waves, and a dielectric loss occurs during the reversal. The dielectric loss tangent means that when an AC electric field is applied to a dielectric, part of electrical energy in the dielectric is converted to heat and is lost. The higher the frequency of the AC electric field, the more vulnerable. The loss due to the dielectric loss tangent is called a dielectric loss.

Thus, a low relative permittivity material having a low dielectric loss tangent is sought to improve the high-frequency characteristics. In order to use a resin (composite insulating material) containing an insulating material as a filler for a printed circuit board, a substrate material having a low dielectric loss tangent obtained from material which has a low relative permittivity is desirable.

As a substance used as such a filler, for instance, silica is typically known and has a low relative permittivity (about 4.5). However, the dielectric loss tangent is from about 0.003 to 0.005, which does not lead to improvement in high-frequency characteristics. In particular, the dielectric loss tangent contributes to the reduction of dielectric loss more than the relative permittivity. Thus, a substance with a low dielectric loss tangent, such as forsterite, is desirable as an alternative material to silica.

As a method for producing forsterite fine particles, disclosed is a method for obtaining forsterite particles having a primary particle diameter in the range of 1 nm to 200 nm, the method comprising drying a solution containing a water-soluble magnesium salt and colloidal silica in a molar ratio (Mg/Si) of 2 and then firing the same at a temperature of 800° C. to 1,000° C. (see Patent Document 1).

In addition, when an insulating material such as forsterite particles is mixed with a resin, the particle shape may be lumpy or angular. In this case, it has been shown that the toughness of the composite insulating material is reduced. It is also described that spherical insulating particles are included (see Patent Document 2).

PRIOR ART DOCUMENTS

Patent Documents

Patent Document 1: Japanese Patent Application Laid-Open Publication No. 2016-222517
Patent Document 2: Japanese Patent Application Laid-Open Publication No. 2003-002640

SUMMARY OF THE INVENTION

Problems to be Solved by the Invention

The present invention has been made in view of such circumstances. The object of the invention is to provide forsterite particles having a low dielectric loss tangent. In addition, the object of the invention is to provide a substrate material having a low dielectric loss tangent in order to suppress signal deterioration due to the substrate insulator material. Further, the object of the invention is to provide a substrate having improved dielectric properties and a less transmission loss (dielectric loss) by blending spherical forsterite particles, which are spheroidized and easily blended with a resin, with a resin to prepare a substrate material because the forsterite particles have a low dielectric loss tangent.

Furthermore, the object of the invention is to provide a substrate having improved high-frequency characteristics by producing forsterite particles having a low dielectric loss tangent and a spherical particle shape.

Means for Solving the Problems

Specifically, a first aspect of the invention provides forsterite particles having an average particle size of from 0.1 nm to 10 nm and a dielectric loss tangent of from 0.0003 to 0.0025.

A second aspect of the invention provides the forsterite particles according to the first aspect, wherein a sphericity calculated according to the following Formula (3) is from 1.0 to 3.3, $$\text{Sphericity} = L_s/N_s \quad \text{Formula (3)}$$

[wherein $L_s$ represents the average particle size (μm) measured with a laser diffraction particle size distribution analyzer, and $N_s$ represents an average primary particle size (μm) calculated by using a specific surface area conversion of a term measured according to a nitrogen gas adsorption method].

A third aspect of the invention provides the forsterite particles according to the first or second aspect, wherein a moisture adsorption amount calculated according to the following Formula (4) for the forsterite particles is 0.15% or less, $$\text{Moisture adsorption amount}(\%) = [(m_1 - m_2)/m_2] \times 100 \quad \text{Formula (4)}$$

[wherein $m_1$ represents a mass (g) of the forsterite particles after dried at a temperature of 150° C. for 24 h and then left at a temperature of 25° C. and a humidity of 50% for 48 h, and $m_2$ represents a mass (g) of the forsterite particles after dried at 150° C. for 24 h].

A fourth aspect of the invention provides the forsterite particles according to any one of the first aspect to third aspect, wherein an MgO/SiO$_2$ molar ratio is from 1.90 to 2.10.

A fifth aspect of the invention provides the forsterite particles according to any one of the first aspect to fourth aspect, wherein a surface of the particles is coated with at least one hydrolyzable silane selected from the group consisting of hydrolyzable silanes represented by the following Formula (1) and Formula (2):

Formula (1)

Formula (2)

[wherein in Formula (1), $R^1$ is a group that contains an acryloxy group, a methacryloxy group, an aryl group, an alkyl group, a glycidoxy group, or a $C_{1-10}$ alkylene group containing any of the functional groups and is bonded to an Si atom via an Si—C bond, a represents an integer of 1 to 3, $R^2$ is a hydrolyzing group consisting of an alkoxy group, an acyloxy group, or a halogen atom, at least one $R^2$ hydrolyzing group forms an M-O—Si bond on a surface of metal oxide particles, and M represents an Si atom or an Mg atom; and in Formula (2), $R^3$ is an alkyl group and is bonded to a silicon atom via an Si—C bond, $R^4$ is a hydrolyzing group consisting of an alkoxy group, an acyloxy group, or a halogen atom, at least one $R^4$ hydrolyzing group forms an M-O—Si bond on a surface of metal oxide particles, M represents an Si atom or an Mg atom, Y represents an alkylene group, an arylene group, an NH group, or an oxygen atom, d represents an integer of 0 to 3, and e is an integer of 0 or 1].

A sixth aspect of the invention provides a method for producing the forsterite particles according to any one of the first to fourth aspects, comprising the following step (A) to step (C):

step (A): a step of mixing a magnesium compound as a magnesium source and a silicon compound as a silicon source such that magnesium and silicon have an MgO/SiO$_2$ molar ratio of from 1.90 to 2.10 to prepare forsterite particles;

step (B): a step of putting the forsterite particles prepared in step (A) into a hydrocarbon combustion flame to recover the resulting forsterite particles; and step (C): a step of firing the forsterite particles obtained in step (B) at 700° C. to 1100° C.

A seventh aspect of the invention provides the production method according to the sixth aspect, wherein the magnesium compound serving as the magnesium source in step (A) is an inorganic magnesium compound or an organic acid magnesium salt.

An eighth aspect of the invention provides the production method according to the seventh aspect, wherein the inorganic magnesium compound is magnesium oxide, magnesium hydroxide, basic magnesium carbonate, magnesium hydrogencarbonate, magnesium carbonate, magnesium nitrate, or a mixture thereof.

A ninth aspect of the invention provides the production method according to the seventh aspect, wherein the organic acid magnesium salt is a $C_{1-4}$ aliphatic magnesium monocarboxylate, a $C_{1-4}$ halogenated aliphatic magnesium monocarboxylate, a $C_{1-4}$ aliphatic magnesium polycarboxylate, a $C_{1-4}$ aliphatic magnesium hydroxycarboxylate, a $C_{1-4}$ magnesium alkoxycarboxylate, a $C_{1-4}$ magnesium oxo-carboxylate, or a mixture thereof.

A tenth aspect of the invention provides the production method according to the sixth aspect, wherein the silicon compound serving as the silicon source in step (A) is silicon oxide, alkoxysilane, or a mixture thereof.

An eleventh aspect of the invention provides the production method according to any one of the sixth aspect to tenth aspect, wherein a temperature of the hydrocarbon combustion flame in step (B) is from 1900° C. to 3000° C. as a theoretical temperature.

A twelfth aspect of the invention provides the production method according to any one of the sixth aspect to eleventh aspect, further comprising step (D) of crushing the forsterite particles obtained in step (C).

A thirteenth aspect of the invention provides the production method according to any one of the sixth aspect to twelfth aspect, further comprising step (E) of coating the forsterite particles obtained in step (C) with the hydrolyzable silane according to the fifth aspect.

A fourteenth aspect of the invention provides a resin composition comprising a resin and the forsterite particles according to any one of the first aspect to fifth aspect.

A fifteenth aspect of the invention provides the resin composition according to the fourteenth aspect, wherein a proportion between the resin and the forsterite particles is 1:0.001 to 1000 by mass ratio.

A sixteenth aspect of the invention provides the resin composition according to the fourteenth or fifteenth aspect, wherein a dielectric loss tangent thereof is from 0.0003 to 0.01.

Effects of the Invention

Forsterite particles of the invention have high crystallinity and a low dielectric loss tangent. Thus, the forsterite particles are easy to blend with a resin, and exert, when used as a substrate material, an effect of producing a substrate having satisfactory high-frequency characteristics.

The forsterite particles of the invention have an average primary particle size of from 0.1 μm to 10 μm and a dielectric loss tangent of from 0.0003 to 0.0025. Then, the forsterite particles are spherical particles with a specific sphericity and have high crystallinity, and the integrated intensity at the diffraction peak of 2θ=52 degrees to 53 degrees as measured by X-ray diffractometry (CuKα) is 800 counts·deg or more, from 800 counts·deg to 2000 counts·deg, or from 800 counts·deg to 1000 counts·deg.

In the invention, the dielectric loss tangent immediately after step (A) is a high value of from 0.003 to 0.02. Here, the target low dielectric loss tangent of from 0.0003 to 0.0025 can be achieved through spheroidization by thermal spraying in step (B) and through restoration of crystallinity by re-firing (annealing) in step (C).

In the invention, the molar ratio of MgO/SiO$_2$ in the forsterite particles in step (A) is from 1.90 to 2.10. This molar ratio does not change even after step (B) or (C) and further (D) or (E) and is from 1.90 to 2.10.

The forsterite particles of the invention can be produced by firing a magnesium-containing silicon compound obtained by mixing a magnesium compound as a magnesium source and a silicon compound as a silicon source at an MgO/SiO$_2$ molar ratio of from 1.90 to 2.10 (preferably 2.0) to prepare forsterite particles; and by putting the forsterite particles into a hydrocarbon combustion flame by thermal spraying to produce spherical forsterite particles. The forsterite particles, which are a raw material before thermal spraying, are crushed particles due to crushing before put into, as powder, the combustion flame, but are changed to spherical forsterite particles by thermal spraying.

MODES FOR CARRYING OUT THE INVENTION

The invention is directed to forsterite particles having an average particle size of from 0.1 μm to 10 μm and a dielectric loss tangent of from 0.0003 to 0.0025.

It is possible to use, as the value for the average particle size (μm), the average particle size (μm) measured by a laser diffraction particle size distribution analyzer.

The value for the dielectric loss tangent can be measured by a method such as a transmission line method or a resonator method. As will be described later, in the measurement in the form of powder or film, the values at 1 GHz and 10 GHz may be measured by a cavity perturbation resonance technique among resonator methods for evaluation.

The forsterite particles of the invention have a sphericity of from 1.0 to 3.3 as calculated according to the following Formula (3):

Sphericity=$L_s/N_s$   Formula (3)

[wherein $L_s$ represents the average particle size (μm) measured with a laser diffraction particle size distribution analyzer, and $N_s$ represents an average primary particle size (μm) calculated by conversion using a specific surface area, a term measured according to a nitrogen gas adsorption method].

As the sphericity is closer to 1.0, the shape is closer to a sphere, and the forsterite particles obtained in the invention can have a sphericity of from 1.0 to 3.3.

For the forsterite particles of the invention, the integrated intensity at the diffraction peak of 2θ=52 degrees to 53 degrees as measured by X-ray diffractometry using CuKα radiation is 800 counts·deg or more, from 800 to 2000 counts·deg, or from 800 to 1000 counts·deg. At 2θ=52 degrees to 53 degrees, there are X-ray diffraction characteristic peaks derived from the (222), (042), and (321) planes specific to forsterite, and the forsterite particles of the invention have high crystallinity. Thus, the integrated intensity thereof, namely the sum of them is in the range of 800 counts·deg or more, from 800 to 2000 counts·deg, or from 800 to 1000 counts·deg. Note that in the measurement of X-ray diffraction at 2θ=52 degrees to 53 degrees, a mechanical error between X-ray diffractometers used for the measurement is take into account and a range of ±0.5 degrees should be included.

Since the forsterite particles obtained in the invention are particles obtained by thermal spraying, raw materials are once melted and then spheroidized. This causes the moisture adsorption amount to be low because the amount of hydroxy group present on the particle surface is small. Due to these properties, the forsterite particles may be mixed with a resin and may then be used as a substrate material. In that case, it is possible to maintain high insulation for a long period of time. The amount of moisture adsorption amount due to the hydroxy groups on the surface of the forsterite particles may be measured using, for instance, about 100 g of forsterite particles, and then calculated by the following Formula (4):

Moisture adsorption amount(%)=$[(m_1-m_2)/m_2]\times100$   Formula (4)

[wherein $m_1$ represents a mass (g) of the forsterite particles after dried at a temperature of 150° C. for 24 h and then left at a temperature of 25° C. and a humidity of 50% for 48 h, and $m_2$ represents a mass (g) of the forsterite particles after dried at 150° C. for 24 h].

The above moisture adsorption amount may be 0.15% or less, from 0.001% to 0.15%, or from 0.01% to 0.15%.

The forsterite particles of the invention may have an MgO/SiO$_2$ molar ratio of from 1.90 to 2.10. It is preferable that the forsterite particles have an MgO/SiO$_2$ molar ratio of 2.0 and are used in an MgO/SiO$_2$ molar ratio of 2.0. But even if the forsterite particles may contain a trace amount of, for instance, silica, magnesia, and/or steatite, this may be permitted as long as substantially the same effects can be exerted.

In the invention, high insulating properties are exhibited when the forsterite particles are further hydrophobized to be used as a substrate material. Accordingly, a hydrolyzable silane compound may be reacted with the surface of the forsterite particles.

Further, the invention is directed to forsterite particles, the surface of which is coated with at least one hydrolyzable silane selected from the group consisting of hydrolyzable silane compounds represented by the following Formula (1) and Formula (2).

Examples of these hydrolyzable silane compounds that can be used include at least one hydrolyzable silane compound selected from the group consisting of hydrolyzable silane compounds represented by the following Formula (1) and Formula (2):

$R^1{}_a Si(R^2)_{4-a}$   Formula (1)

$[R^3{}_a Si(R^4)_{3-d}]_2 Y_e$   Formula (2)

wherein in Formula (1), $R^1$ is a group that contains an acryloxy group, a methacryloxy group, an aryl group, an alkyl group, a glycidoxy group, or a $C_{1-10}$ alkylene group containing any of the functional groups and is bonded to an Si atom via an Si—C bond, a represents an integer of 1 to 3, $R^2$ is a hydrolyzing group consisting of an alkoxy group, an acyloxy group, or a halogen atom, at least one $R^2$ hydrolyzing group forms an M-O—Si bond on a surface of metal oxide particles, and M represents an Si atom or an Mg atom; and in Formula (2), $R^3$ is an alkyl group and is bonded to a silicon atom via an Si—C bond, $R^4$ is a hydrolyzing group consisting of an alkoxy group, an acyloxy group, or a halogen atom, at least one $R^4$ hydrolyzing group forms an M-O—Si bond on a surface of metal oxide particles, M represents an Si atom or an Mg atom, Y represents an alkylene group, an arylene group, an NH group, or an oxygen atom, d represents an integer of 0 to 3, and e is an integer of 0 or 1.

A plurality of hydrolyzing groups may be present in Formula (1) and Formula (2). In this case, any silanol group caused by their hydrolysis may be bonded to the surface of the metal oxide particles (the surface of the forsterite particles) at an arbitrary ratio to form an M-O—Si bond. M indicates an Si atom or Mg atom. For instance, three hydrolyzing groups may be present and three silanol groups may then be formed. In this case, three M-O—Si bonds may be formed, two M-O—Si bonds may be formed, or one M-O—Si bond may be formed. The remaining silanol groups are free. It is also possible to hydrolyze all of the plurality of hydrolyzing groups in the hydrolyzable silane compound represented by Formula (1) and Formula (2). Alternatively, some of them may remain as a hydrolyzing group(s) in an unhydrolyzed state.

The above alkyl group is a linear or branched $C_{1-10}$ alkyl group. Examples of the alkyl group include a methyl group, ethyl group, n-propyl group, i-propyl group, n-butyl group, i-butyl group, s-butyl group, t-butyl group, n-pentyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, n-hexyl, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, or 1-ethyl-2-methyl-n-propyl group.

The alkyl group may be a cyclic alkyl group. Examples of a $C_{1-10}$ cyclic alkyl group include a cyclopropyl group, cyclobutyl group, 1-methyl-cyclopropyl group, 2-methyl-cyclopropyl group, cyclopentyl group, 1-methyl-cyclobutyl group, 2-methyl-cyclobutyl group, 3-methyl-cyclobutyl group, 1,2-dimethyl-cyclopropyl group, 2,3-dimethyl-cyclopropyl group, 1-ethyl-cyclopropyl group, 2-ethyl-cyclopropyl group, cyclohexyl group, 1-methyl-cyclopentyl group, 2-methyl-cyclopentyl group, 3-methyl-cyclopentyl group, 1-ethyl-cyclobutyl group, 2-ethyl-cyclobutyl group, 3-ethyl-cyclobutyl group, 1,2-dimethyl-cyclobutyl group, 1,3-dimethyl-cyclobutyl group, 2,2-dimethyl-cyclobutyl group, 2,3-dimethyl-cyclobutyl group, 2,4-dimethyl-cyclobutyl group, 3,3-dimethyl-cyclobutyl group, 1-n-propyl-cyclopropyl group, 2-n-propyl-cyclopropyl group, 1-i-propyl-cyclopropyl group, 2-i-propyl-cyclopropyl group, 1,2,2-trimethyl-cyclopropyl group, 1,2,3-trimethyl-cyclopropyl group, 2,2,3-trimethyl-cyclopropyl group, 1-ethyl-2-methyl-cyclopropyl group, 2-ethyl-1-methyl-cyclopropyl group, 2-ethyl-2-methyl-cyclopropyl group, or 2-ethyl-3-methyl-cyclopropyl group.

Examples of the alkylene group include an alkylene group derived from any of the above alkyl groups. For instance, a methyl group may correspond to a methylene group, an ethyl group may correspond to an ethylene group, and a propyl group may correspond to a propylene group.

The alkenyl group may be a $C_{2-10}$ alkenyl group, and examples thereof include an ethenyl group, 1-propenyl group, 2-propenyl group, 1-methyl-1-ethenyl group, 1-butenyl group, 2-butenyl group, 3-butenyl group, 2-methyl-1-propenyl group, 2-methyl-2-propenyl group, 1-ethylethenyl group, 1-methyl-1-propenyl group, 1-methyl-2-propenyl group, 1-pentenyl group, 2-pentenyl group, 3-pentenyl group, 4-pentenyl group, 1-n-propylethenyl group, 1-methyl-1-butenyl group, 1-methyl-2-butenyl group, 1-methyl-3-butenyl group, 2-ethyl-2-propenyl group, 2-methyl-1-butenyl group, 2-methyl-2-butenyl group, 2-methyl-3-butenyl group, 3-methyl-1-butenyl group, 3-methyl-2-butenyl group, 3-methyl-3-butenyl group, 1,1-dimethyl-2-propenyl group, 1-i-propylethenyl group, 1,2-dimethyl-1-propenyl group, 1,2-dimethyl-2-propenyl group, 1-cyclopentenyl group, 2-cyclopentenyl group, 3-cyclopentenyl group, 1-hexenyl group, 2-hexenyl group, 3-hexenyl group, 4-hexenyl group, 5-hexenyl group, 1-methyl-1-pentenyl group, 1-methyl-2-pentenyl group, 1-methyl-3-pentenyl group, 1-methyl-4-pentenyl group, 1-n-butylethenyl group, 2-methyl-1-pentenyl group, 2-methyl-2-pentenyl group, 2-methyl-3-pentenyl group, 2-methyl-4-pentenyl group, 2-n-propyl-2-propenyl group, 3-methyl-1-pentenyl group, 3-methyl-2-pentenyl group, 3-methyl-3-pentenyl group, 3-methyl-4-pentenyl group, 3-ethyl-3-butenyl group, 4-methyl-1-pentenyl group, 4-methyl-2-pentenyl group, 4-methyl-3-pentenyl group, 4-methyl-4-pentenyl group, 1,1-dimethyl-2-butenyl group, 1,1-dimethyl-3-butenyl group, 1,2-dimethyl-1-butenyl group, 1,2-dimethyl-2-butenyl group, 1,2-dimethyl-3-butenyl group, 1-methyl-2-ethyl-2-propenyl group, 1-s-butylethenyl group, 1,3-dimethyl-1-butenyl group, 1,3-dimethyl-2-butenyl group, 1,3-dimethyl-3-butenyl group, 1-i-butylethenyl group, 2,2-dimethyl-3-butenyl group, 2,3-dimethyl-1-butenyl group, 2,3-dimethyl-2-butenyl group, 2,3-dimethyl-3-butenyl group, 2-i-propyl-2-propenyl group, 3,3-dimethyl-1-butenyl group, 1-ethyl-1-butenyl group, 1-ethyl-2-butenyl group, 1-ethyl-3-butenyl group, 1-n-propyl-1-propenyl group, 1-n-propyl-2-propenyl group, 2-ethyl-1-butenyl group, 2-ethyl-2-butenyl group, 2-ethyl-3-butenyl group, 1,1,2-trimethyl-2-propenyl group, 1-t-butyl ethenyl group, 1-methyl-1-ethyl-2-propenyl group, 1-ethyl-2-methyl-1-propenyl group, 1-ethyl-2-methyl-2-propenyl group, 1-i-propyl-1-propenyl group, 1-i-propyl-2-propenyl group, 1-methyl-2-cyclopentenyl group, 1-methyl-3-cyclopentenyl group, 2-methyl-1-cyclopentenyl group, 2-methyl-2-cyclopentenyl group, 2-methyl-3-cyclopentenyl group, 2-methyl-4-cyclopentenyl group, 2-methyl-5-cyclopentenyl group, 2-methylene-cyclopentyl group, 3-methyl-1-cyclopentenyl group, 3-methyl-2-cyclopentenyl group, 3-methyl-3-cyclopentenyl group, 3-methyl-4-cyclopentenyl group, 3-methyl-5-cyclopentenyl group, 3-methylene-cyclopentyl group, 1-cyclohexenyl group, 2-cyclohexenyl group, or 3-cyclohexenyl group.

Examples of the aryl group include a $C_{6-20}$ aryl group. Examples thereof include a phenyl group, o-methylphenyl group, m-methylphenyl group, p-methylphenyl group, o-chlorophenyl group, m-chlorophenyl group, p-chlorophenyl group, o-fluorophenyl group, p-mercaptophenyl group, o-methoxyphenyl group, p-methoxyphenyl group, p-aminophenyl group, p-cyanophenyl group, α-naphthyl group, β-naphthyl group, o-biphenylyl group, m-biphenylyl group, p-biphenylyl group, 1-anthryl group, 2-anthryl group, 9-anthryl group, 1-phenanthryl group, 2-phenanthryl group, 3-phenanthryl group, 4-phenanthryl group, or 9-phenanthryl group.

Examples of the epoxy group-containing organic group include glycidoxymethyl, glycidoxyethyl, glycidoxypropyl, glycidoxybutyl, or epoxycyclohexyl.

Examples of the acryloyl group-containing organic group include acryloylmethyl, acryloylethyl, or acryloylpropyl.

Examples of the methacryloyl group-containing organic group include methacryloylmethyl, methacryloylethyl, or methacryloylpropyl.

Examples of the mercapto group-containing organic group include ethyl mercapto, butyl mercapto, hexyl mercapto, or octyl mercapto.

Examples of the cyano group-containing organic group include cyanoethyl or cyanopropyl.

Examples of the $C_{1-10}$ alkoxy group include an alkoxy group having a $C_{1-10}$ linear, branched, or cyclic alkyl moiety. Examples of the alkoxy group include a methoxy group, ethoxy group, n-propoxy group, i-propoxy group, n-butoxy group, i-butoxy group, s-butoxy group, t-butoxy group, n-pentyloxy group, 1-methyl-n-butoxy group, 2-methyl-n-butoxy group, 3-methyl-n-butoxy group, 1,1-dimethyl-n-propoxy group, 1,2-dimethyl-n-propoxy group, 2,2-dimethyl-n-propoxy group, 1-ethyl-n-propoxy group, n-hexyloxy group, 1-methyl-n-pentyloxy group, 2-methyl-n-pentyloxy group, 3-methyl-n-pentyloxy group, 4-methyl-n-pentyloxy group, 1,1-dimethyl-n-butoxy group, 1,2-dimethyl-n-butoxy group, 1,3-dimethyl-n-butoxy group, 2,2-dimethyl-n-butoxy group, 2,3-dimethyl-n-butoxy group, 3,3-dimethyl-n-butoxy group, 1-ethyl-n-butoxy group, 2-ethyl-n-butoxy group, 1,1,2-trimethyl-n-propoxy group, 1,2,2-trimethyl-n-propoxy group, 1-ethyl-1-methyl-n-propoxy group, and 1-ethyl-2-methyl-n-propoxy group. Examples of the cyclic alkoxy group include cyclopropoxy group, cyclobutoxy group, 1-methyl-cyclopropoxy group, 2-methyl-cyclopropoxy group, cyclopentyloxy group, 1-methyl-cyclobutoxy group, 2-methyl-cyclobutoxy group, 3-methyl-cyclobutoxy group, 1,2-dimethyl-cyclopropoxy group, 2,3-dimethyl-cyclopropoxy group, 1-ethyl-cyclopropoxy group, 2-ethyl-cyclopropoxy group, cyclohexyloxy group, 1-methyl-cyclopentyloxy group, 2-methyl-cyclopentyloxy group, 3-methyl-cyclopentyloxy group, 1-ethyl-cyclobutoxy group, 2-ethyl-cyclobutoxy group, 3-ethyl-cyclobutoxy group, 1,2-dimethyl-cyclobutoxy group, 1,3-dimethyl-cyclobutoxy group, 2,2-dimethyl-cyclobutoxy group, 2,3-dimethyl-cyclobutoxy group, 2,4-dimethyl-cyclobutoxy group, 3,3-dimethyl-cyclobutoxy group, 1-n-propyl-cyclopropoxy group, 2-n-propyl-cyclopropoxy group, 1-i-propyl-cyclopropoxy group, 2-i-propyl-cyclopropoxy group, 1,2,2-trimethyl-cyclopropoxy group, 1,2,3-trimethyl-cyclopropoxy group, 2,2,3-trimethyl-cyclopropoxy group, 1-ethyl-2-methyl-cyclopropoxy group, 2-ethyl-1-methyl-cyclopropoxy group, 2-ethyl-2-methyl-cyclopropoxy group, or 2-ethyl-3-methyl-cyclopropoxy group.

Examples of the $C_{2-20}$ acyloxy group include a methylcarbonyloxy group, ethylcarbonyloxy group, n-propylcarbonyloxy group, i-propylcarbonyloxy group, n-butylcarbonyloxy group, i-butylcarbonyloxy group, s-butylcarbonyloxy group, t-butylcarbonyloxy group, n-pentylcarbonyloxy group, 1-methyl-n-butylcarbonyloxy group, 2-methyl-n-butylcarbonyloxy group, 3-methyl-n-butylcarbonyloxy group, 1,1-dimethyl-n-propylcarbonyloxy group, 1,2-dimethyl-n-propylcarbonyloxy group, 2,2-dimethyl-n-propylcarbonyloxy group, 1-ethyl-n-propylcarbonyloxy group, n-hexylcarbonyloxy group, 1-methyl-n-pentylcarbonyloxy group, 2-methyl-n-pentylcarbonyloxy group, 3-methyl-n-pentylcarbonyloxy group, 4-methyl-n-pentylcarbonyloxy group, 1,1-dimethyl-n-butylcarbonyloxy group, 1,2-dimethyl-n-butylcarbonyloxy group, 1,3-dimethyl-n-butylcarbonyloxy group, 2,2-dimethyl-n-butylcarbonyloxy group, 2,3-dimethyl-n-butylcarbonyloxy group, 3,3-dimethyl-n-butylcarbonyloxy group, 1-ethyl-n-butylcarbonyloxy group, 2-ethyl-n-butylcarbonyloxy group, 1,1,2-trimethyl-n-propylcarbonyloxy group, 1,2,2-trimethyl-n-propylcarbonyloxy group, 1-ethyl-1-methyl-n-propylcarbonyloxy group, 1-ethyl-2-methyl-n-propylcarbonyloxy group, phenylcarbonyloxy group, or tosylcarbonyloxy group.

Examples of the halogen atom include a fluorine atom, a chlorine atom, a bromine atom, or an iodine atom.

Examples of the silicon-containing compound represented by Formula (1) include tetramethoxysilane, tetrachlorosilane, tetraacetoxysilane, tetraethoxysilane, tetra-n-propoxysilane, tetraisopropoxysilane, tetra-n-butoxysilane, tetraacetoxysilane, methyltrimethoxysilane, methyltrichlorosilane, methyltriacetoxysilane, methyltripropoxysilane, methyltriacetixysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenyloxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycydoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltrichlorosilane, vinyltriacetoxysilane, vinyltriethoxysilane, vinyltriacetoxysilane, methoxyphenyltrimethoxysilane, methoxyphenyltriethoxysilane, methoxyphenyltriacetoxysilane, methoxyphenyltrichlorosilane, methoxybenzyltrimethoxysilane, methoxybenzyltriethoxysilane, methoxybenzyltriacetoxysilane, methoxybenzyltrichlorosilane, methoxyphenethyltrimethoxysilane, methoxyphenethyltriethoxysilane, methoxyphenethylriacetoxysilane, methoxyphenethyltrichlorosilane, ethoxyphenyltrimethoxysilane, ethoxyphenyltriethoxysilane, ethoxyphenyltriacetoxysilane, ethoxyphenyltrichlorosilane, ethoxybenzyltrimethoxysilane, ethoxybenzyltriethoxysilane, ethoxybenzyltriacetoxysilane, ethoxybenzyltrichlorosilane, isopropoxyphenyltrimethoxysilane, isopropoxyphenyltriethoxysilane, isopropoxyphenyltriacetoxysilane, isopropoxyphenyltrichlorosilane, isopropoxybenzyltrimethoxysilane, isopropoxybenzyltriethoxysilane, isopropoxybenzyltriacetoxysilane, isopropoxybenzyltrichlorosilane, t-butoxyphenyltrimethoxysilane, t-butoxyphenyltriethoxysilane, t-butoxyphenyltriacetoxysilane, t-butoxyphenyltrichlorosilane, t-butoxybenzyltrimethoxysilane, t-butoxybenzyltriethoxysilane, t-butoxybenzyltriacetoxysilane, t-butoxysibenzyltrichlorosilane, methoxynaphthyltrimethoxysilane, methoxynaphthyltriethoxysilane, methoxynaphthylriacetoxysilane, methoxynaphthyltrichlorosilane, ethoxynaphthyltrimethoxysilane, ethoxynaphthyltriethoxysilane, ethoxynaphthyltriacetoxysilane, ethoxynaphthyltrichlorosilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, methylvinyldimethoxysilane, or methylvinyldiethoxysilane.

Examples of the silicon-containing compound represented by Formula (2) include methylenebistrimethoxysilane, methylenebistrichlorosilane, methylenebistriacetoxysilane, ethylenebistriethoxysilane, ethylenebistrichlorosilane, ethylenebistriacetoxysilane, propylenebistriethoxysilane, butylenebistrimethoxysilane, phenylenebistrimethoxysilane, phenylenebistriethoxysilane, phenylenebismethyldiethoxysilane, phenylenebismethyldimethoxysilane, naphthylenebistrimethoxysilane, bistrimethoxydisilane, bistriethoxydisilane, bisethyldiethoxydisilane, bismethyldimethoxydisilane, hexamethyldisilane, hexamethyldisilazane, or hexamethyldisiloxane.

For hydrolysis of an alkoxysilyl group, an acyloxysilyl group, or a halogenated silyl group, 0.5 mol to 100 mol (preferably 1 mol to 10 mol) of water is used per mol of the hydrolyzable group.

In addition, 0.001 mol to 10 mol (preferably 0.001 to 1 mol) of a hydrolysis catalyst may be used per mol of the hydrolyzable group.

The reaction temperature for hydrolysis and surface coating is usually from 20° C. to 80° C.

The hydrolysis may be completely or partially performed. That is, an unhydrolyzed monomer may remain in the hydrolysate.

The hydrolysis may be carried out by adding water and heating. In addition, a catalyst may be used at the time of hydrolysis and surface coating.

Nitric acid is used as the hydrolysis catalyst. In addition to nitric acid, a metal chelate compound, an organic acid, an inorganic acid, an organic base, or an inorganic base may be used in combination.

The forsterite particles may be coated with a silane compound by a drying procedure or by dispersing the particles in water or an organic solvent. The aqueous solvent for the dispersion may be replaced with an organic solvent. The solvent may be replaced by evaporation or ultrafiltration. Examples of the organic solvent include methanol, ethanol, isopropanol, butanol, diacetone alcohol, methylcellosolve acetate, ethylcellosolve acetate, propylene glycol, propylene glycol monomethyl ether, propylene glycol monoethyl ether, methyl isobutyl carbinol, propylene glycol monobutyl ether, propylene glycol monomethyl ether acetate, propylene glycol monoethyl ether acetate, propylene glycol monopropyl ether acetate, propylene glycol monobutyl ether acetate, toluene, xylene, methyl ethyl ketone, cyclopentanone, cyclohexanone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropinoate, ethyl 3-methoxypropionate, ethyl 3-ethoxypropionate, methyl 3-ethoxypropionate, methyl pyruvate, ethyl pyruvate, ethylene glycol monomethyl ether, ethylene glycol monoethyl ether, ethylene glycol monopropyl ether, ethylene glycol monobutyl ether, ethylene glycol monomethyl ether acetate, ethylene glycol monoethyl ether acetate, ethylene glycol monopropyl ether acetate, ethylene glycol monobutyl ether acetate, diethylene glycol dimethyl ether, diethylene glycol diethyl ether, diethylene glycol dipropyl ether, diethylene glycol dibutyl ether, propylene glycol dimethyl ether, propylene glycol diethyl ether, propylene glycol dipropyl ether, propylene glycol dibutyl ether, ethyl lactate, propyl lactate, isopropyl lactate, butyl lactate, isobutyl lactate, methyl formate, ethyl formate, propyl formate, isopropyl formate, butyl formate, isobutyl formate, amyl formate, isoamyl formate, methyl acetate, ethyl acetate, amyl acetate, isoamyl acetate, hexyl acetate, methyl propionate, ethyl propionate, propyl propionate, isopropyl propionate, butyl propionate, isobutyl propionate, methyl butyrate, ethyl butyrate, propyl butyrate, isopropyl butyrate, butyl butyrate, isobutyl butyrate, ethyl hydroxyacetate, ethyl 2-hydroxy-2-methylpropionate, methyl 3-methoxy-2-methylpropionate, methyl 2-hydroxy-3-methybutyrate, ethyl methoxyacetate, ethyl ethoxyacetate, methyl 3-methoxypropionate, ethyl 3-ethoxypropionate, ethyl 3-methoxypropionate, 3-methoxybutyl acetate, 3-methoxypropyl acetate, 3-methyl-3-methoxybutyl acetate, 3-methyl-3-methoxybutyl propionate, 3-methyl-3-methoxybutyl butyrate, methyl acetoacetate, methyl propyl ketone, methyl butyl ketone, 2-heptanone, 3-heptanone, 4-heptanone, N,N-dimethylformamide, N-methylacetamide, N,N-dimethylacetamide, N-methylpyrrolidone, 4-methyl-2-pentanol, or γ-butyrolactone.

These solvents may be used singly, or two or more kinds thereof may be used in combination.

The method for producing forsterite particles according to the invention includes the following step (A) to step (C):

step (A): a step of mixing a magnesium compound as a magnesium source and a silicon compound as a silicon source such that magnesium and silicon have an MgO/SiO$_2$ molar ratio of from 1.90 to 2.10 to prepare forsterite particles;

step (B): a step of putting the forsterite particles prepared in step (A) into a hydrocarbon combustion flame to recover the resulting forsterite particles; and step (C): a step of firing the forsterite particles obtained in step (B) at 700° C. to 1100° C.

The magnesium compound serving as the magnesium source in step (A) may be an inorganic magnesium compound or an organic acid magnesium salt.

The inorganic magnesium compound that can be used is, for instance, magnesium oxide, magnesium hydroxide, basic magnesium carbonate, magnesium hydrogencarbonate, magnesium carbonate, magnesium nitrate, or a mixture thereof.

Examples of the organic acid magnesium salt that can be used include a magnesium salt of $C_{1-4}$ aliphatic monocarboxylic acid (e.g., magnesium formate, magnesium acetate, magnesium propionate, magnesium butyrate, magnesium isobutyrate, magnesium valerate, magnesium acrylate, magnesium crotonate), a magnesium salt of halogenated $C_{1-4}$ aliphatic monocarboxylic acid (e.g., magnesium monochloroacetate, magnesium dichloroacetate, magnesium trichloroacetate), a magnesium salt of $C_{1-4}$ aliphatic polyvalent carboxylic acid (e.g., magnesium malonate, magnesium succinate, magnesium adipate, magnesium maleate), a magnesium salt of $C_{1-4}$ aliphatic hydroxycarboxylic acid (e.g., magnesium glycolate, magnesium lactate, magnesium glycerate, magnesium malate, magnesium tartrate, magnesium citrate, magnesium gluconate), a magnesium salt of $C_{1-4}$ alkoxycarboxylic acid (e.g., magnesium methoxyacetate, magnesium ethoxyacetate), a magnesium salt of $C_{1-4}$ oxocarboxylic acid (e.g., magnesium acetoacetate), or a mixture thereof.

The silicon compound serving as the silicon source in step (A) may be silicon oxide, alkoxysilane, or a mixture thereof.

Examples of the silicon oxide that can be used include colloidal silica, silica gel, fumed silica, Aerosil, precipitated silica, melt silica, or silica stone. As the particle size that can be used, the average primary particle size may be in the range of from 10 nm to 100 μm.

Examples of the alkoxysilane, as a silicon compound serving as a silicon source, that can be used include tetramethoxysilane, tetraethoxysilane, or a hydrolysate thereof or a hydrolyzed condensate thereof, or a mixture thereof. Silica particles obtained by hydrolyzing and condensing alkoxysilane may be used.

The magnesium compound as a magnesium source and the silicon compound as a silicon source can be dry- or wet-mixed. In the case of dry mixing, each powder may be uniformly mixed with, for instance, a mixer. In the case of wet mixing, one of the powders may be mixed with an aqueous medium for the other powder, or both aqueous media may be mixed using a mixing/dispersing machine such as a disperser. Since it is possible to use a silica sol as an aqueous media of the colloidal silica, the silica sol is used as the aqueous media as mentioned above.

The forsterite particles used in the invention are prepared by mixing a magnesium compound as a magnesium source and a silicon compound as a silicon source so as to have a $MgO/SiO_2$ molar ratio of from 1.90 to 2.10 (preferably 2.0) and firing them to give forsterite particles as a raw material. The resulting forsterite particles can be used as a raw material for step (B) described later. Alternatively, commercially available forsterite particles may be used as a starting material and may be a raw material used in step (B) described later.

A magnesium compound as a magnesium source and a silicon compound as a silicon source may be mixed and fired to synthesize forsterite particles as a raw material in the invention. In this case, it is preferable that the firing temperature is from 800° C. to 1800° C. and the firing time is from about 1 h to 10 h. The forsterite particles obtained in step (A) are non-spherical particles, and then can be pulverized into fine non-spherical (crushed) powder for thermal spraying in step (B).

In the invention, the crushed particles can be spheroidized while the particle size is maintained even after step (B). The particle size in step (A) can be set to a particle size close to the particle size of the spherical particles obtained in step (C). Thus, the particle size of the crushed forsterite particles in step (A) can be set in the range of from 0.1 μm to 10 μm.

Step (B) is a step of converting non-spherical (crushed) forsterite particles into spherical forsterite particles by thermal spraying. This step is a step of putting the forsterite particles prepared in step (A) into a hydrocarbon combustion flame. In the thermal spraying method, a raw material is put into the combustion flame of a burner. As a result, the raw material is melted and can be spheroidized by surface tension while falling due to gravity. Thus, the crushed forsterite particles put into the hydrocarbon combustion flame are melted and spheroidized by the surface tension while falling due to gravity to generate spherical forsterite particles. The resulting spherical forsterite particles have a few surface silanol groups because the surface is melted, have a low specific surface area, and are unlikely to cause fusion. When the crushed forsterite particles are put into the combustion flame, the particles may be either in an aqueous solution or powder state, but in order to promote melting, it is preferable that the powdery forsterite particles are directly put into the combustion flame.

For the burner, it is possible to use, as gas for burning hydrocarbon (combustion gas), the air (at an oxygen level of 20.9%), an oxygen-rich air (at an oxygen level of 20.9% or more and less than 100%), and oxygen (at an oxygen level of 100%). Examples of the burner for burning hydrocarbon include air burners (at a theoretical temperature of 1800° C.), oxygen-rich air burners (at a theoretical temperature of from 1800° C. to 2800° C.), or oxygen burners (at a theoretical temperature of from 2800° C. to 3000° C.). Here, forsterite has a melting point of from 1880° C. to 1900° C. Accordingly, it is preferable that the theoretical temperature of the hydrocarbon combustion flame in step (B) is from 1900° C. to 3000° C. Thus, an oxygen burner is preferably used.

When the raw material is put into the burner, it is possible to handle the raw material forsterite particles in an aqueous medium or the raw material forsterite particle themselves as powder. Thus, in the invention, the latter method of directly putting the powder into the burner may be adopted. In a combustion furnace, powder of raw material forsterite particles is put into a flame caused by hydrocarbon gas (for example, industrial city gas of standard 13A or propane gas is used as a hydrocarbon source) and combustion gas (oxygen); and the forsterite particles that are melted, vaporized, and aggregated in the upper part of the combustion furnace become spherical and are cooled in the process of falling to the lower part of the combustion furnace. The post-combustion gas containing the forsterite particles guided to the lower part of the combustion furnace is diluted and cooled with external air, and is taken out of the furnace through a cyclone dust collector and a filter device by suction of the gas while using a fan. The cyclone and the filter are provided partway through the pipe, so that the spherical forsterite particles can be separated. The recovery rate may be set to be in the range of from 40% to 90%.

The level of combustion in the furnace depends on the size of the equipment, but may be, for instance, within the range of from 50,000 kcal/h to 200,000 kcal/h, such as 120,000 kcal/h. The supply rate of the raw material powder into the furnace may be set to be, for instance, within the range of from 1 kg/h to 20 kg/h, such as 7.5 kg/h.

In step (C), the forsterite particles obtained in step (B) are fired at from 700° C. to 1100° C. to improve the crystallinity. The above forsterite particles have features such as a small surface area due to the production by thermal spraying, low moisture absorption due to a small amount of surface hydroxy group, and difficulty in causing fusion between the particles. The appropriate re-firing temperature in step (C) is from 700° C. to 1100° C. Sufficient crystallinity cannot be obtained at 700° C. or lower, and particle fusion tends to occur at 1100° C. or higher. The above forsterite particles have high crystallinity especially at a firing temperature of from 800° C. to 1100° C., from 800° C. to 1000° C., or particularly from 800° C. to 900° C. The forsterite particles are preferable because they can have a low dielectric loss tangent value of 0.0011 or less, for instance, from 0.0009 to 0.0011.

The raw material forsterite particles in step (A) are crushed particles; the integrated intensity at the diffraction peak of 2θ=52 degrees to 53 degrees as measured by X-ray diffractometry using CuKα radiation is 800 counts·deg or less; and the dielectric loss tangent has a value of from about 0.003 to 0.02.

The crystallinity deteriorates due to rapid cooling at the time of falling from the combustion flame in step (B). Thus, this causes an inappropriate dielectric loss tangent value. For the spherical forsterite particles obtained in step (B), the integrated intensity at the diffraction peak of 2θ=52 degrees to 53 degrees as measured by X-ray diffractometry using CuKα radiation is 700 counts·deg or less; and the dielectric loss tangent value is from about 0.005 to 0.015.

The crystallinity of the spherical forsterite particles is restored by adding step (C) to produce spherical forsterite particles such that the integrated intensity at the diffraction peak of 2θ=52 degrees to 53 degrees as measured by X-ray diffractometry using CuKα radiation is 800 counts·deg or more; and the dielectric loss tangent is from 0.0003 to 0.0025. As described above, the appropriate re-firing temperature is from 700° C. to 1100° C. Meanwhile, sufficient crystallinity cannot be obtained at 700° C. or lower, and particle fusion is likely to occur at 1100° C. or higher.

As described above, in step (C), the forsterite particles have high crystallinity especially at a firing temperature of from 800° C. to 1100° C., from 800° C. to 1000° C., or particularly from 800° C. to 900° C., and have a dielectric loss tangent value of 0.0011 or less, for instance, from 0.0008 to 0.0011, which is preferable.

Further, in the invention, the shape of the forsterite particles in step (A) changes from a non-spherical (crushed) to spherical shape by thermal spraying in step (B), but the spherical particles are obtained while the particle size is maintained. The dielectric loss tangent value of forsterite particles changes in proportion to the magnitude of the particle size. The dielectric loss tangent value is higher for smaller particles. In the invention, the particle size does not change even after step (B). Thus, the dielectric loss tangent value can be kept low.

In addition, the invention has the features such that the surface area is small due to the production by thermal spraying; the moisture absorption is low because the amount of hydroxy groups bonded to Si atoms and Mg atoms present on the surface is small; and the particles are unlikely to be fused to one another.

The forsterite particles after step (C) may be subjected to step (D) of mild crushing in order to eliminate slight adhesions.

In addition, in order to make the surface of the forsterite particles more hydrophobic, the surface may be coated with the above-mentioned hydrolyzable silane.

In the invention, the forsterite particles may be mixed with a resin to produce a substrate material. The resin mixture may be obtained by mixing and kneading the forsterite particles with a molten resin. For kneading, a batch kneader, a continuous kneader, a twin-screw extruder, or the like may be used. Meanwhile, in the case of using a resin to be dissolved in a solvent, the forsterite particles are added and mixed in a solvent, in which the resin has been dissolved, to form a varnish. The resulting varnish may be used to coat or impregnate a substrate, and then cured by heating and/or light irradiation to produce the substrate material.

Examples of the substrate resin include polytetrafluoroethylene (PTFE), oligophenylene ether resin (OPE), polyphenylene ether resin (PPE), polyethylene resin (PE), bismaleimide triazine resin (BT), liquid crystal resin (LCP), polysulfone resin (PS), polyether sulfone resin (PES), polycarbonate resin (PC), polyimide resin (PI), epoxy resin (EP), polyarylate resin (PA), or phenol resin (PN). It is desirable that the substrate resin also has a low relative permittivity and a low dielectric loss tangent value. Polytetrafluoroethylene (PTFE), oligophenylene ether resin (OPE), polyphenylene ether resin (PPE), bismaleimide triazine resin (BT), or liquid crystal resin (LCP) may be used to prepare a substrate having a low dielectric loss tangent.

The substrate resin may be used such that the proportion between the resin to the forsterite particles is in the range of 1:0.001 to 1000, 1:0.01 to 300, or 1:0.1 to 100 by mass ratio.

The dielectric loss tangent of the substrate resin in which the resin and the forsterite particles are mixed may be in the range of from 0.0003 to 0.01.

Mixing of the forsterite particles with the resin for substrate may be affected by thermal expansion and hydrophobicity of the resin, and as long as the above characteristics are not impaired, particles such as silica particles or cordierite particles, glass cloth, and the like may be included in addition to the forsterite particles.

EXAMPLES (Evaluation Protocols)
To Measure Average Particle Size
A laser diffraction particle size distribution analyzer, trade name MASTERSIZER 2000 (manufactured by Malvern), was used for measurement.
To Measure Dielectric Loss Tangent
A cavity resonator jig at measurement frequencies of 1 GHz and 10 GHz (manufactured by KEYCOM Corp.) was used, and each powder sample was charged into a PTFE sample tube (length: 30 mm; inner diameter: 3 mm (for 1 GHz) or 1 mm (for 10 GHz)). Then, a vector network analyzer, trade name FieldFox N6626A (manufactured by KEYSIGHT TECHNOLOGIES), was used for measurement.
To Measure Specific Surface Area by BET Method
A surface area measuring device, trade name Monosorb (manufactured by Quantachrome INSTRUMENTS), for the BET method was used for measurement performed by a one-point procedure (relative pressure: 0.3) using the BET method. Note that the average primary particle size was calculated by $(3/(3.2 \text{ (g/cm}^3) \times \text{specific surface area (m}^2\text{/g)})) \times 2$ (μm).
XRD Measurement (Powder X-Ray Diffractometry)
An X-ray diffractometer, trade name MiniFlex 600 (manufactured by Rigaku Corporation), was used for measurement at a tube voltage of 40 kV and a tube current of 15 mA. Note that the integrated intensity was calculated as counts·deg (or cps·deg) by processing the data measured above using general powder X-ray analysis software, trade name PDXL2.
To Measure Moisture Adsorption Rate
Each powder sample was weighed in a magnetic crucible and dried in a dryer at a temperature of 150° C. for 24 h. The mass after drying was weighed, the sample was then kept in a constant temperature/humidity chamber set at a temperature of 25° C. and a humidity of 50% for 48 h, and the mass was then re-weighed. The moisture adsorption rate (%) was calculated according to the following Formula (4):

$$\text{Moisture adsorption amount}(\%) = [(m_1 - m_2)/m_2] \times 100 \quad \text{Formula (4)}$$

[wherein $m_1$ represents a mass (g) of the forsterite particles after dried at a temperature of 150° C. for 24 h and then left at a temperature of 25° C. and a humidity of 50% for 48 h, and $m_2$ represents a mass (g) of the forsterite particles after dried at 150° C. for 24 h].
(To Synthesize Forsterite Powder)

Production Example 1

Step (A): basic magnesium carbonate powder (manufactured by KONOSHIMA Co., Ltd.) and silica sol (trade name: Snowtex XS, manufactured by Nissan Chemical Corporation) were mixed such that the molar ratio was MgO:SiO$_2$=2:1, and dried. After crushed with a cutter mill, the dried product was fired in an electric furnace at 1200° C. for 2 h to prepare a forsterite powder.

Further, the resulting powder was pulverized with a dry jet mill at a pressure of 0.64 MPa to prepare a crushed forsterite powder (with an average particle size of 2.3 μm).

(To Synthesize Spherical Forsterite Powder)

Example 1

Step (B): the crushed forsterite powder prepared in Production Example 1 was put at a supply rate of 7.5 kg/h into the flame (theoretical temperature: 3000° C.) of an oxygen burner such that propane gas was used as fuel and the combustion amount was set to 120,000 kcal so as to perform thermal spraying. Then, a cyclone collector was used to obtain a thermally sprayed-spherical forsterite powder.

Step (C): the powder obtained in step (B) was fired at 700° C. for 2 h using an electric furnace to prepare forsterite powder.

The powder obtained by firing was kept in a spherical shape, had an average particle size of 5.9 μm, and had a dielectric loss tangent of 0.0015 at a measurement frequency of 1 GHz and 0.0017 at a measurement frequency of 10 GHz.

In addition, the average primary particle size (particle size by the BET method) calculated from the specific surface area by the BET method was 2.4 μm, and the sphericity calculated from the ratio with respect to the above average particle size was 2.5.

Further, the integrated intensity at the diffraction peak of 52 degrees to 53 degrees as measured by XRD (CuKα) was 894 counts·deg, and the moisture adsorption rate was 0.06%.

Example 2

The same operation as in Example 1 was repeated, except that the firing temperature of the electric furnace in step (C) was changed to 800° C., to prepare a forsterite powder.

The powder obtained by firing was kept in a spherical shape, had an average particle size of 6.0 μm, and had a dielectric loss tangent of 0.0009 at a measurement frequency of 1 GHz and 0.0008 at a measurement frequency of 10 GHz.

In addition, the average primary particle size (particle size by the BET method) calculated from the specific surface area by the BET method was 2.6 μm, and the sphericity calculated from the ratio with respect to the above average particle size was 2.3.

Further, the integrated intensity at the diffraction peak of 52 degrees to 53 degrees as measured by XRD (CuKα) was 917 counts·deg, and the moisture adsorption rate was 0.07%.

Example 3

The same operation as in Example 1 was repeated, except that the firing temperature of the electric furnace in step (C) was changed to 900° C., to prepare a forsterite powder.

The powder obtained by firing was kept in a spherical shape, had an average particle size of 7.1 and had a dielectric loss tangent of 0.0015 at a measurement frequency of 1 GHz and 0.0011 at a measurement frequency of 10 GHz.

In addition, the average primary particle size (particle size by the BET method) calculated from the specific surface area by the BET method was 2.6 and the sphericity calculated from the ratio with respect to the above average particle size was 2.7.

Further, the integrated intensity at the diffraction peak of 52 degrees to 53 degrees as measured by XRD (CuKα) was 905 counts·deg, and the moisture adsorption rate was 0.07%.

Example 4

The same operation as in Example 1 was repeated, except that the firing temperature of the electric furnace in step (C) was changed to 1000° C., to prepare a forsterite powder.

The powder particles obtained by firing were apparently slightly aggregated to one another due to the sintering, but were kept in a spherical shape. The powder had an average particle size of 6.3 and had a dielectric loss tangent of 0.0020 at a measurement frequency of 1 GHz and 0.0012 at a measurement frequency of 10 GHz.

In addition, the average primary particle size (particle size by the BET method) calculated from the specific surface area by the BET method was 2.6 and the sphericity calculated from the ratio with respect to the above average particle size was 2.4.

Further, the integrated intensity at the diffraction peak of 52 degrees to 53 degrees as measured by XRD (CuKα) was 899 counts·deg, and the moisture adsorption rate was 0.06%.

Example 5

The same operation as in Example 1 was repeated, except that the firing temperature of the electric furnace in step (C) was changed to 1100° C., to prepare a forsterite powder.

The powder particles obtained by firing were apparently slightly aggregated to one another due to the sintering, but were kept in a spherical shape. The powder had an average particle size of 9.8 and had a dielectric loss tangent of 0.0024 at a measurement frequency of 1 GHz and 0.0013 at a measurement frequency of 10 GHz.

In addition, the average primary particle size (particle size by the BET method) calculated from the specific surface area by the BET method was 3.0 and the sphericity calculated from the ratio with respect to the above average particle size was 3.3.

Further, the integrated intensity at the diffraction peak of 52 degrees to 53 degrees as measured by XRD (CuKα) was 891 counts·deg, and the moisture adsorption rate was 0.03%.

Comparative Example 1

The average particle size of the forsterite powder obtained by firing at 1200° C. for 2 h using an electric furnace in step (C) of Production Example 1 was as large as 13.0 μm, and the dielectric loss tangent was 0.0015 at a measurement frequency of 1 GHz and 0.0012 at a measurement frequency of 10 GHz.

In addition, the average primary particle size (particle size by the BET method) calculated from the specific surface area by the BET method was 1.6 μm, and the sphericity calculated from the ratio with respect to the above average particle size was 8.6.

Further, the integrated intensity at the diffraction peak of 52 degrees to 53 degrees as measured by XRD (CuKα) was 877 counts·deg, and the moisture adsorption rate was 0.12%.

Comparative Example 2

Neither the thermal spraying in step (B) nor the re-firing in step (C) of Example 1 was performed. The average particle size of the crushed forsterite powder obtained after pulverization with a dry jet mill was 2.3 µm, and the dielectric loss tangent was 0.0032 at a measurement frequency of 1 GHz and 0.0042 at a measurement frequency of 10 GHz.

In addition, the primary particle size (BET particle size) calculated from the BET specific surface area was 0.9 µm, and the sphericity calculated from the ratio with respect to the above average particle size was 2.6.

Further, the integrated intensity at the diffraction peak of 52 degrees to 53 degrees as measured by XRD (CuKα) was 818 counts·deg, and the moisture adsorption rate was 0.26%.

Comparative Example 3

The thermally sprayed forsterite powder obtained after the thermal spraying treatment in step (B) of Example 1 was not subjected to re-firing in step (C). The average particle size of the resulting thermally sprayed spherical forsterite powder was 4.2 and the dielectric loss tangent was 0.0050 at a measurement frequency of 1 GHz and 0.0054 at a measurement frequency of 10 GHz.

In addition, the primary particle size (BET particle size) calculated from the BET specific surface area was 2.3 and the sphericity calculated from the ratio with respect to the above average particle size was 1.8.

Further, the integrated intensity at the diffraction peak of 52 degrees to 53 degrees as measured by XRD (CuKα) was 670, and the moisture adsorption rate was 0.16%.

Comparative Example 4

The same operation as in Example 1 was repeated, except that the burner used for thermal spraying in Example 1 was changed to an air burner (theoretical temperature: 1800° C.) and the supply rate of the powder was set to 5.0 kg/h, to yield a thermally sprayed forsterite powder. The resulting powder particles were apparently aggregated markedly to one another, had an average particle size of 7.6 and had a dielectric loss tangent of 0.0043 at a measurement frequency of 1 GHz and 0.0047 at a measurement frequency of 10 GHz.

In addition, the average primary particle size (particle size by the BET method) calculated from the specific surface area by the BET method was 2.2, and the sphericity calculated from the ratio with respect to the above average particle size was 3.5.

Further, the integrated intensity at the diffraction peak of 52 degrees to 53 degrees as measured by XRD (CuKα) was 870 counts·deg, and the moisture adsorption rate was 0.07%.

Comparative Example 5

The forsterite powder obtained in Comparative Example 2 without thermal spraying in step (B) was fired at 800° C. for 2 h using an electric furnace in step (C) to prepare a forsterite powder. The resulting powder particles were apparently aggregated markedly to one another, had an average particle size of 10.2 µm, and had a dielectric loss tangent of 0.0017 at a measurement frequency of 1 GHz and 0.0019 at a measurement frequency of 10 GHz.

In addition, the average primary particle size (particle size by the BET method) calculated from the specific surface area by the BET method was 2.3 µm, and the sphericity calculated from the ratio with respect to the above average particle size was 4.4.

Further, the integrated intensity at the diffraction peak of 52 degrees to 53 degrees as measured by XRD (CuKα) was 872 counts·deg, and the moisture adsorption rate was 0.06%.

Comparative Example 6

The same operation as in Example 1 was repeated, except that the firing temperature of the electric furnace in step (C) was changed to 1200° C., to prepare a forsterite powder.

The powder particles obtained by firing were apparently aggregated markedly to one another due to the sintering, and were not kept in a spherical shape. The powder had an average particle size of 12.5 µm, and had a dielectric loss tangent of 0.0021 at a measurement frequency of 1 GHz and 0.0017 at a measurement frequency of 10 GHz.

In addition, the primary particle size (BET particle size) calculated from the BET specific surface area was 3.5 µm, and the sphericity calculated from the ratio with respect to the above average particle size was 3.6.

Further, the integrated intensity at the diffraction peak of 52 degrees to 53 degrees as measured by XRD (CuKα) was 874, and the moisture adsorption rate was 0.06%.

The results of Example 1 to Example 5 and Comparative Example 1 to Comparative Example 6 are shown in the tables below. In Examples 1 to 5, the average particle size was from 4.2 µm to 9.8 µm, and the dielectric loss tangent was from 0.0008 to 0.0024 at the measurement frequency of 1 GHz or 10 GHz, indicating excellent characteristics as a filler in high frequency applications. In addition, the sphericity calculated from the ratio between the primary particle size (BET particle size) calculated from the BET surface area and the average particle size was from 2.3 to 3.3, which was a favorable numerical value for use as a filler.

Further, the integrated intensity at the diffraction peak of 52 degrees to 53 degrees as measured by XRD (CuKα1) was as high as from 891 counts·deg to 917 counts·deg, demonstrating that the forsterite itself has enough crystallinity to elicit its characteristics. Furthermore, the moisture adsorption rate was a low value of from 0.03% to 0.07%, which was satisfactory as a filler in high frequency applications.

By contrast, in Comparative Examples 1 to 6, the average particle size was as large as 10 µm or more (in Comparative Examples 1, 5 and 6). Even in the case of a small average particle size, the dielectric loss tangent was found to be a high value of 0.0026 or more (in Comparative Examples 2, 3, and 4). This cannot be said to be excellent characteristics as a filler in high frequency applications. In addition, the sphericity calculated from the ratio between the primary particle size (BET particle size) calculated from the BET surface area and the average particle size failed to satisfy the range of from 1.0 to 3.3. This may indicate a value suggesting that the particle aggregation is in progress (in Comparative Example 1, Comparative Example 4, Comparative Example 5, and Comparative Example 6). Thus, this is not satisfactory for use as a filler.

Further, the integrated intensity at the diffraction peak of 52 degrees to 53 degrees as measured by XRD (CuKα) was as low as 850 counts·deg or less. The forsterite itself did not have enough crystallinity to elicit its characteristics (Comparative Example 3). Even when the integrated intensity was from 850 to 1000, the particle aggregation was in progress. Thus, the forsterite was found to be unsuitable as a filler in high frequency applications. Besides, the moisture adsorption rate was shown to be a high value of 0.1% or more (in Comparative Examples 1, 2, and 3), and was unsuitable as a filler in high-frequency applications.

Example 6

The same operation as in Example 1 was repeated, except that forsterite, trade name FF-200-M-40 (with an average particle size of 2.5 μm) manufactured by MARUSU GLAZE Co., Ltd., was used as the forsterite powder used for thermal spraying treatment in Example 1, to yield a thermally sprayed spherical forsterite powder. The resulting powder was fired at 800° C. for 2 h using an electric furnace to prepare a forsterite powder.

The powder obtained by firing was kept in a spherical shape, had an average particle size of 5.6 and had a dielectric loss tangent of 0.0008 at a measurement frequency of 1 GHz and 0.0009 at a measurement frequency of 10 GHz.

In addition, the average primary particle size (particle size by the BET method) calculated from the specific surface area by the BET method was 2.3 and the sphericity calculated from the ratio with respect to the above average particle size was 2.4.

Further, the integrated intensity at the diffraction peak of 52 degrees to 53 degrees as measured by XRD (CuKα) was 873 counts·deg, and the moisture adsorption rate was 0.05%.

Example 7

The same operation as in Example 6 was repeated, except that the firing temperature of the electric furnace was changed to 900° C., to prepare a forsterite powder.

The powder obtained by firing was kept in a spherical shape, had an average particle size of 6.3 and had a dielectric loss tangent of 0.0009 at a measurement frequency of 1 GHz and 0.0010 at a measurement frequency of 10 GHz.

In addition, the average primary particle size (particle size by the BET method) calculated from the specific surface area by the BET method was 2.3 and the sphericity calculated from the ratio with respect to the above average particle size was 2.8.

Further, the integrated intensity at the diffraction peak of 52 degrees to 53 degrees as measured by XRD (CuKα) was 870 counts·deg, and the moisture adsorption rate was 0.05%.

Example 8

The same operation as in Example 6 was repeated, except that the firing temperature of the electric furnace was changed to 1000° C., to prepare a forsterite powder.

The powder particles obtained by firing were apparently slightly aggregated to one another due to the sintering, but were kept in a spherical shape. The powder had an average particle size of 5.7 and had a dielectric loss tangent of 0.0009 at a measurement frequency of 1 GHz and 0.0010 at a measurement frequency of 10 GHz.

In addition, the average primary particle size (particle size by the BET method) calculated from the specific surface area by the BET method was 2.3 and the sphericity calculated from the ratio with respect to the above average particle size was 2.5.

Further, the integrated intensity at the diffraction peak of 52 degrees to 53 degrees as measured by XRD (CuKα) was 865 counts·deg, and the moisture adsorption rate was 0.07%.

Example 9

The same operation as in Example 6 was repeated, except that the firing temperature of the electric furnace was changed to 1100° C., to prepare a forsterite powder.

The powder particles obtained by firing were apparently slightly aggregated to one another due to the sintering, but were kept in a spherical shape. The powder had an average particle size of 6.1 and had a dielectric loss tangent of 0.0011 at a measurement frequency of 1 GHz and 0.0011 at a measurement frequency of 10 GHz.

In addition, the average primary particle size (particle size by the BET method) calculated from the specific surface area by the BET method was 2.5 and the sphericity calculated from the ratio with respect to the above average particle size was 2.4.

Further, the integrated intensity at the diffraction peak of 52 degrees to 53 degrees as measured by XRD (CuKα1) was 882 counts·deg, and the moisture adsorption rate was 0.05%.

Comparative Example 7

Purchased forsterite, trade name FF-200-M-40 manufactured by MARUSU GLAZE Co., Ltd., was treated without thermal spraying of step (B) in Example 6. The resulting average particle size was 4.3 μm, and the dielectric loss tangent was 0.0115 at a measurement frequency of 1 GHz and 0.0198 at a measurement frequency of 10 GHz.

In addition, the primary particle size (BET particle size) calculated from the BET specific surface area was 0.1 μm, and the sphericity calculated from the ratio with respect to the above average particle size was 31.9.

Further, the integrated intensity at the diffraction peak of 52 degrees to 53 degrees as measured by XRD (CuKα) was 791 counts·deg, and the moisture adsorption rate was 0.40%.

Comparative Example 8

The thermal spraying of step (B) in Example 6 was carried out, but the firing of step (C) was not performed. The average particle size of the resulting thermally sprayed spherical forsterite powder was 5.2 μm, and the dielectric loss tangent was 0.0095 at a measurement frequency of 1 GHz and 0.0130 at a measurement frequency of 10 GHz.

In addition, the primary particle size (BET particle size) calculated from the BET specific surface area was 2.4 μm, and the sphericity calculated from the ratio with respect to the above average particle size was 2.2.

Further, the integrated intensity at the diffraction peak of 52 degrees to 53 degrees as measured by XRD (CuKα) was 361 counts·deg, and the moisture adsorption rate was 0.09%.

The results of Example 6 to Example 9 and Comparative Example 7 and Comparative Example 8 are shown in the tables below. In Examples 6 to 9, the average particle size was from 5.6 μm to 6.3 μm, and the dielectric loss tangent was from 0.0008 to 0.0011 at the measurement frequency of 1 GHz or 10 GHz, indicating excellent characteristics as a filler in high frequency applications. In addition, the sphericity calculated from the ratio between the average primary particle size (particle size measured by the BET method) calculated from the specific surface area by the BET method and the average particle size was from 2.4 to 2.8, which was a favorable numerical value for use as a filler.

Further, the integrated intensity at the diffraction peak of 52 degrees to 53 degrees as measured by XRD (CuKα) was as high as from 870 counts·deg to 882 counts·deg, demonstrating that the forsterite itself has enough crystallinity to elicit its characteristics. Furthermore, the moisture adsorption rate was a small value of from 0.05% to 0.07%, which was satisfactory as a filler in high frequency applications.

By contrast, in Comparative Examples 7 and 8, the dielectric loss tangent was found to be high value of 0.0026 or more. This cannot be said to be excellent characteristics as a filler in high frequency applications.

Besides, the moisture adsorption rate was shown to be a high value of 0.1% or more (in Comparative Example 7), and was unsuitable as a filler in high-frequency applications.

(Surface Treatment of Spherical Forsterite Particles)

Example 10

First, 2-propanol was added to the forsterite powder obtained in Example 2 so that the concentration of the forsterite powder was 20% by mass. Further, water was added so that the water concentration became 1%. Here, phenyltrimethoxysilane was added so as to have a mass ratio of 0.01% with respect to the forsterite powder. Next, the surface was treated by heating in a container while stirring and was then subjected to heat-treatment under reflux conditions for 5 h. After cooling, the contents were transferred to a flat container to remove the solvent, and then dried at 150° C. overnight (approximately 12 h) to prepare a surface-treated forsterite powder.

The average particle size pf the resulting powder was 6.0 μm, and the dielectric loss tangent was 0.0007 at a measurement frequency of 1 GHz and 0.0006 at a measurement frequency of 10 GHz.

In addition, the average primary particle size (particle size by the BET method) calculated from the specific surface area by the BET method was 2.2 μm, and the sphericity calculated from the ratio with respect to the above average particle size was 2.7.

Further, the integrated intensity at the diffraction peak of 52 degrees to 53 degrees as measured by XRD (CuKα) was 917 cps·deg, and the moisture adsorption rate was 0.05%.

(Resin Composition Containing Spherical Forsterite Particles) (Polymer Solution Formulation Example 1) First, 31.6 g of trade name OPE-2St 2200 (manufactured by MITSUBISHI GAS CHEMICAL COMPANY, INC.)/toluene (OPE, toluene solution, at a concentration of 63% by mass) as oligophenylene ether and 20.0 g of polystyrene-poly(ethylene-butylene) block-polystyrene (PSEBS, manufactured by Sigma-Aldrich, with a weight-average molecular weight of 118,000) were blended at OPE:PSEBS=50:50 by mass ratio. Then, the mixture was diluted with 148.3 g of toluene so that the polymer concentration was 20% by mass. In this way, 200 g of mother polymer solution was prepared by stirring at room temperature.

Example 11

To 8.0 g of the mother polymer solution (at a polymer concentration of 20% by mass) prepared in Formulation Example 1 was added 0.4 g of the forsterite powder prepared in Example 6. Next, 1.6 g of toluene was added so that the solid content concentration became 20% by mass. Then, the mixture was stirred and mixed at room temperature for 1 h to prepare a polymer/forsterite mixed solution. Note that the polymer/forsterite ratio was 80/20 by mass ratio.

The prepared mixed solution was cast on a cellulosic release film and dried at 100° C. to remove the solvent. After that, the cellulosic release film was peeled off, and the rest was heated and cured at 200° C. for 2 h to prepare a composite film (with a thickness of about 30 μm).

A test piece with a width of 30 mm and a length of from 60 mm to 70 mm was cut out from the prepared composite film. The test piece was rolled into a cylindrical shape and then loaded into a PTFE tube with a length of 30 mm and an inner diameter of 3 mm. Then, the dielectric loss tangent at a frequency of 1 GHz as measured by the cavity perturbation resonance technique was 0.0014.

Example 12

To 6.0 g of the mother polymer solution (at a polymer concentration of 20% by mass) prepared in Formulation Example 1 was added 0.8 g of the forsterite powder prepared in Example 6. Next, 3.2 g of toluene was added so that the solid content concentration became 20% by mass. Then, the mixture was stirred and mixed at room temperature for 1 h to prepare a polymer/forsterite mixed solution. Note that the polymer/forsterite ratio was 60/40 by mass ratio.

The prepared mixed solution was used to prepare a composite film by substantially the same operation as in Example 11. As a result, the dielectric loss tangent at a frequency of 1 GHz as measured by the cavity perturbation resonance technique was 0.0014.

Example 13

To 4.0 g of the mother polymer solution (at a polymer concentration of 20% by mass) prepared in Formulation Example 1 was added 1.2 g of the forsterite powder prepared in Example 6. Next, 4.8 g of toluene was added so that the solid content concentration became 20% by mass. Then, the mixture was stirred and mixed at room temperature for 1 h to prepare a polymer/forsterite mixed solution. Note that the polymer/forsterite ratio was 40/60 by mass ratio.

The prepared mixed solution was used to prepare a composite film by substantially the same operation as in Example 11. As a result, the dielectric loss tangent at a frequency of 1 GHz as measured by the cavity perturbation resonance technique was 0.0013.

Comparative Example 9

The same operation as in Example 11 was repeated, except that the forsterite powder was not added and the mother polymer solution prepared in Formulation Example 1 was used, to prepare a polymer film. As a result, the dielectric loss tangent at a frequency of 1 GHz as measured by the cavity perturbation resonance technique was 0.0015.

Comparative Example 10

To 8.0 g of the mother polymer solution (at a polymer concentration of 20% by mass) prepared in Formulation Example 1 was added 0.4 g of the forsterite powder prepared in Comparative Example 1. Next, 1.6 g of toluene was added so that the solid content concentration became 20% by mass. Then, the mixture was stirred and mixed at room temperature for 1 h to prepare a polymer/forsterite mixed solution. Note that the polymer/forsterite ratio was 80/20 by mass ratio.

The prepared mixed solution was used to prepare a composite film by substantially the same operation as in Example 11. As a result, the dielectric loss tangent at a frequency of 1 GHz as measured by the cavity perturbation resonance technique was 0.0015.

Comparative Example 11

To 6.0 g of the mother polymer solution (at a polymer concentration of 20% by mass) prepared in Formulation Example 1 was added 0.8 g of the forsterite powder prepared in Comparative Example 1. Next, 3.2 g of toluene was added so that the solid content concentration became 20% by mass. Then, the mixture was stirred and mixed at room temperature for 1 h to prepare a polymer/forsterite mixed solution.

The prepared mixed solution was used to prepare a composite film by substantially the same operation as in Example 11. As a result, the dielectric loss tangent at a frequency of 1 GHz as measured by the cavity perturbation resonance technique was 0.0015. Note that the polymer/forsterite ratio was 60/40 by mass ratio.

Comparative Example 12

To 4.0 g of the mother polymer solution (at a polymer concentration of 20% by mass) prepared in Formulation Example 1 was added 1.2 g of the forsterite powder prepared in Comparative Example 1. Next, 4.8 g of toluene was added so that the solid content concentration became 20% by mass. Then, the mixture was stirred and mixed at room temperature for 1 h to prepare a polymer/forsterite mixed solution. Note that the polymer/forsterite ratio was 40/60 by mass ratio.

The prepared mixed solution was used to prepare a composite film by substantially the same operation as in Example 11. As a result, the dielectric loss tangent at a frequency of 1 GHz as measured by the cavity perturbation resonance technique was 0.0015.

The results of Example 11 to Example 13 and Comparative Example 9 to Comparative Example 12 are shown in the tables below. As clear from the tables below, the dielectric loss tangent of the polymer film alone was 0.0015 (Comparative Example 9). By contrast, in the polymer/forsterite composite film having the forsterite powder of the present invention blended, the dielectric loss tangent was a lower value of from 0.0013 to 0.0014 (Examples 11 to 13). This has demonstrated the effect of lowering the dielectric loss tangent by blending the forsterite powder of the invention, and has successfully verified excellent characteristics as a filler in high frequency applications. By contrast, in the case of using the forsterite powder prepared in Comparative Example 1, the dielectric loss tangent of the polymer/forsterite composite film was 0.0015 (in Comparative Examples 10 to 12). Here, the effect of lowering the dielectric loss tangent by blending the forsterite powder was not found.

TABLE 1

|  | Example 1 | Example 2 | Example 3 | Example 4 |
|---|---|---|---|---|
| Average particle size (μm) | 5.9 | 6.0 | 7.1 | 6.3 |
| Dielectric loss tangent at 1 GHz | 0.0015 | 0.0009 | 0.0015 | 0.0020 |
| Dielectric loss tangent at 10 GHz | 0.0017 | 0.0008 | 0.0011 | 0.0012 |
| Sphericity | 2.5 | 2.3 | 2.7 | 2.4 |
| Integrated intensity by X-ray diffractometry | 894 | 917 | 905 | 899 |
| Moisture adsorption amount (%) | 0.06 | 0.07 | 0.07 | 0.06 |

TABLE 2

|  | Example 5 | Example 6 | Example 7 | Example 8 |
|---|---|---|---|---|
| Average particle size (μm) | 9.8 | 5.6 | 6.3 | 5.7 |
| Dielectric loss tangent at 1 GHz | 0.0024 | 0.0008 | 0.0009 | 0.0009 |
| Dielectric loss tangent at 10 GHz | 0.0013 | 0.0009 | 0.0010 | 0.0010 |
| Sphericity | 3.3 | 2.4 | 2.8 | 2.5 |
| Integrated intensity by X-ray diffractometry | 891 | 873 | 870 | 865 |
| Moisture adsorption amount (%) | 0.03 | 0.05 | 0.05 | 0.07 |

TABLE 3

|  | Example 9 | Example 10 | Comparative Example 1 | Comparative Example 2 |
|---|---|---|---|---|
| Average particle size (μm) | 6.1 | 6.0 | 13.0 | 2.3 |
| Dielectric loss tangent at 1 GHz | 0.0011 | 0.0007 | 0.0015 | 0.0032 |
| Dielectric loss tangent at 10 GHz | 0.0011 | 0.0006 | 0.0012 | 0.0042 |
| Sphericity | 2.4 | 2.7 | 8.6 | 2.6 |
| Integrated intensity by X-ray diffractometry | 882 | 917 | 877 | 818 |
| Moisture adsorption amount (%) | 0.05 | 0.05 | 0.12 | 0.26 |

TABLE 4

|  | Comparative Example 3 | Comparative Example 4 | Comparative Example 5 | Comparative Example 6 |
|---|---|---|---|---|
| Average particle size (μm) | 4.2 | 7.6 | 10.2 | 12.5 |
| Dielectric loss tangent at 1 GHz | 0.0050 | 0.0043 | 0.0017 | 0.0021 |
| Dielectric loss tangent at 10 GHz | 0.0054 | 0.0047 | 0.0019 | 0.0017 |
| Sphericity | 1.8 | 3.5 | 4.4 | 3.6 |
| Integrated intensity by X-ray diffractometry | 670 | 870 | 872 | 874 |
| Moisture adsorption amount (%) | 0.16 | 0.07 | 0.06 | 0.06 |

TABLE 5

|  | Comparative Example 7 | Comparative Example 8 |
|---|---|---|
| Average particle size (μm) | 4.3 | 5.2 |
| Dielectric loss tangent at 1 GHz | 0.0115 | 0.0095 |
| Dielectric loss tangent at 10 GHz | 0.0198 | 0.0130 |
| Sphericity | 31.9 | 2.2 |
| Integrated intensity by X-ray diffractometry | 791 | 361 |
| Moisture adsorption amount (%) | 0.40 | 0.09 |

TABLE 6

(in Table 6, P represents parts by mass of polymer, and F represents parts by mass of forsterite)

| | Example 11 | Example 12 | Example 13 |
|---|---|---|---|
| P/F | 80/20 | 60/40 | 40/60 |
| Dielectric loss tangent at 1 GHz | 0.0014 | 0.0014 | 0.0013 |

TABLE 7

(in Table 7, P represents parts by mass of polymer, and F represents parts by mass of forsterite)

| | Comparative Example 9 | Comparative Example 10 | Comparative Example 11 | Comparative Example 12 |
|---|---|---|---|---|
| P/F | 100/0 | 80/20 | 60/40 | 40/60 |
| Dielectric loss tangent at 1 GHz | 0.0015 | 0.0015 | 0.0015 | 0.0015 |

INDUSTRIAL APPLICABILITY

Forsterite particles having a low dielectric loss tangent can be provided. In addition, it is possible to provide a substrate material having a low dielectric loss tangent in order to suppress signal deterioration due to the insulator material of the substrate. Further, the invention can provide a substrate having improved dielectric properties and a less transmission loss by including spherical forsterite particles, which are spheroidized and easily blended with a resin, in a resin to prepare a substrate material because the forsterite particles have a low dielectric loss tangent. Furthermore, it is possible to produce forsterite having a low dielectric loss tangent and a spherical particle shape, and to provide a substrate having improved high-frequency characteristics.

The invention claimed is:

1. Forsterite particles having an average particle size of from 0.1 μm to 10 μm and a dielectric loss tangent of from 0.0003 to 0.0025 at 1 GHz and 10 GHz, wherein a surface of the particles is coated with at least one hydrolyzable silane selected from the group consisting of hydrolyzable silanes represented by the following Formula (1) and Formula (2):

$$R^1_a Si(R^2)_{4-a} \quad \text{Formula (1)}$$

$$[R^3_d Si(R^4)_{3-d}]_2 Y_e \quad \text{Formula (2)}$$

wherein in Formula (1), $R^1$ is a group that contains an acryloxy group, a methacryloxy group, an aryl group, an alkyl group, a glycidoxy group, or a $C_{1-10}$ alkylene group containing any of the functional groups and is bonded to an Si atom via an Si—C bond, a represents an integer of 1 to 3, $R^2$ is a hydrolyzing group consisting of an alkoxy group, an acyloxy group, or a halogen atom, at least one $R^2$ hydrolyzing group forms an M-O—Si bond on a surface of metal oxide particles, and M represents an Si atom or an Mg atom; and in Formula (2), $R^3$ is an alkyl group and is bonded to a silicon atom via an Si—C bond, $R^4$ is a hydrolyzing group consisting of an alkoxy group, an acyloxy group, or a halogen atom, at least one $R^4$ hydrolyzing group forms an M-O—Si bond on a surface of metal oxide particles, M represents an Si atom or an Mg atom, Y represents an alkylene group, an arylene group, an NH group, or an oxygen atom, d represents an integer of 0 to 3, and e is an integer of 0 or 1.

2. A method for producing the forsterite particles having an average particle size of from 0.1 μm to 10 μm and a dielectric loss tangent of from 0.0003 to 0.0025 at 1 GHz and 10 GHz, comprising the following step (A) to step (C):
step (A): a step of mixing a magnesium compound as a magnesium source and a silicon compound as a silicon source such that magnesium and silicon have an MgO/SiO$_2$ molar ratio of from 1.90 to 2.10 to prepare forsterite particles;
step (B): a step of putting the forsterite particles prepared in step (A) into a hydrocarbon combustion flame to recover the resulting forsterite particles; and
step (C): a step of firing the forsterite particles obtained in step (B) at 700° C. to 1100° C.

3. The production method according to claim 2, wherein the magnesium compound serving as the magnesium source in step (A) is an inorganic magnesium compound or an organic acid magnesium salt.

4. The production method according to claim 3, wherein the inorganic magnesium compound is magnesium oxide, magnesium hydroxide, basic magnesium carbonate, magnesium hydrogencarbonate, magnesium carbonate, magnesium nitrate, or a mixture thereof.

5. The production method according to claim 3, wherein the organic acid magnesium salt is a $C_{1-4}$ aliphatic magnesium monocarboxylate, a $C_{1-4}$ halogenated aliphatic magnesium monocarboxylate, a $C_{1-4}$ aliphatic magnesium polycarboxylate, a $C_{1-4}$ aliphatic magnesium hydroxycarboxylate, a $C_{1-4}$ magnesium alkoxycarboxylate, a $C_{1-4}$ magnesium oxo-carboxylate, or a mixture thereof.

6. The production method according to claim 2, wherein the silicon compound serving as the silicon source in step (A) is silicon oxide, alkoxysilane, or a mixture thereof.

7. The production method according to claim 2, wherein a temperature of the hydrocarbon combustion flame in step (B) is from 1900° C. to 3000° C. as a theoretical temperature.

8. The production method according to claim 2, further comprising step (D) of crushing the forsterite particles obtained in step (C).

9. The production method according to claim 2, further comprising step (E) of coating the forsterite particles obtained in step (C) with at least one hydrolyzable silane selected from the group consisting of hydrolyzable silanes represented by the following Formula (1) and Formula (2):

$$R^1_a Si(R^2)_{4-a} \quad \text{Formula (1)}$$

$$[R^3_d Si(R^4)_{3-d}]_2 Y_e \quad \text{Formula (2)}$$

wherein in Formula (1), $R^1$ is a group that contains an acryloxy group, a methacryloxy group, an aryl group, an alkyl group, a glycidoxy group, or a $C_{1-10}$ alkylene group containing any of the functional groups and is bonded to an Si atom via an Si—C bond, a represents an integer of 1 to 3, $R^2$ is a hydrolyzing group consisting of an alkoxy group, an acyloxy group, or a halogen atom, at least one $R^2$ hydrolyzing group forms an M-O—Si bond on a surface of metal oxide particles, and M represents an Si atom or an Mg atom; and in Formula (2), $R^3$ is an alkyl group and is bonded to a silicon atom via an Si—C bond, $R^4$ is a hydrolyzing group consisting of an alkoxy group, an acyloxy group, or a halogen atom, at least one $R^4$ hydrolyzing group forms an M-O—Si bond on a surface of metal oxide particles, M represents an Si atom or an Mg atom, Y represents an alkylene group, an arylene group, an NH group, or an oxygen atom, d represents an integer of 0 to 3, and e is an integer of 0 or 1.

* * * * *